May 2, 1967 R. E. LAMME 3,317,247
COMBINED WHEEL COVER AND LOCKING MEANS
Filed May 24, 1965 4 Sheets-Sheet 1

INVENTOR
ROBERT E. LAMME
BY
Salvatore G. Militan,
attorney

May 2, 1967  R. E. LAMME  3,317,247
COMBINED WHEEL COVER AND LOCKING MEANS
Filed May 24, 1965  4 Sheets-Sheet 2

INVENTOR
ROBERT E. LAMME
BY Salvatore G. Militana
attorney

May 2, 1967 R. E. LAMME 3,317,247
COMBINED WHEEL COVER AND LOCKING MEANS
Filed May 24, 1965 4 Sheets-Sheet 3

INVENTOR
ROBERT E. LAMME
BY
Salvatore G. Militana
attorney

United States Patent Office 3,317,247
Patented May 2, 1967

3,317,247
COMBINED WHEEL COVER AND LOCKING MEANS
Robert E. Lamme, 41 E. 19th St., Hialeah, Fla. 33010
Filed May 24, 1965, Ser. No. 458,106
4 Claims. (Cl. 301—37)

This invention relates to wheel covers and is more particularly directed to a combined wheel cover and locking means and is an improvement over my U.S. Patent No. 3,170,733, for Wheel Cover With Locking Means.

A principal object of the present invention is to provide a wheel for an automotive vehicle with a wheel cover having a locking means that locks the wheel cover to the wheel and cannot be removed until the locking means has been unlocked by a key.

Another object of the present invention is to provide a wheel cover for an automotive vehicle wheel that locks to the wheel thereby preventing the loss of wheel covers by stealing or by the wheel cover slipping or falling off as occurs very commonly with the use of the conventional wheel covers.

A further object of the present invention is to provide an automotive vehicle with a wheel cover that can be locked to the wheel wherein the wheel cover is readily mounted on the wheel and is just as readily removed therefrom.

A still further object of the present invention is to provide a wheel cover that is locked together with the wheel on which it is mounted wherein the peripheral edge of the wheel cover engages the wheel to place a tension on the wheel cover so that the wheel cover is firmly affixed to the wheel and will spring off the wheel when the lock has been disengaged.

A still further object of the present invention is to provide a combined wheel cover and locking means for automobile vehicles which is simple in construction, inexpensive in cost and most effective to prevent the pilferage of wheel covers.

With these and other objects in view, the invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claims.

Figure 1:
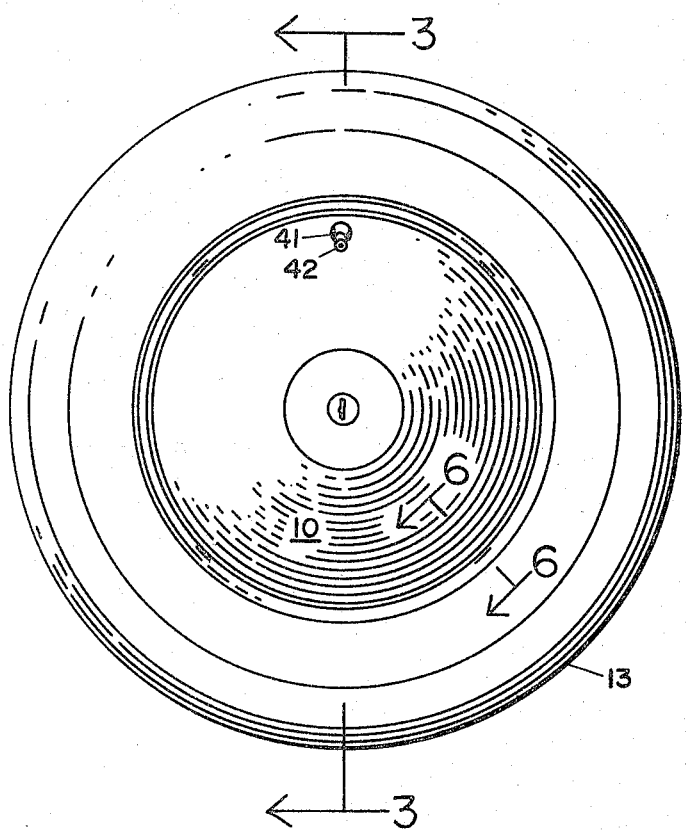
FIGURE 1 is a frontal elevational view of a wheel upon which my wheel cover is mounted.
Figure 2:
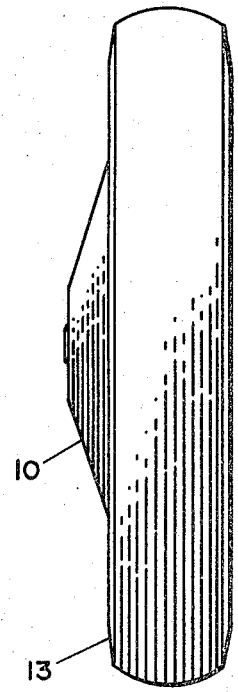
FIGURE 2 is an end elevational view thereof.
Figure 5:
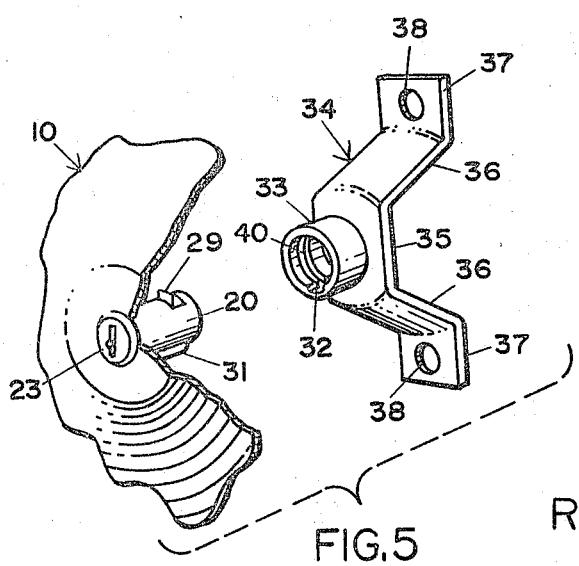
FIGURE 5 is a fragmentary perspective view of my wheel cover and mounting bracket.

Referring to the drawings wherein like numerals are used to designate similar parts throughout the several views, the numeral 10 refers to my wheel cover shown secured in position on a conventional automobile wheel 11 which has a rim 12 welded or otherwise fastened about the periphery thereof, with a tire 13 mounted thereon. On conventional automobiles there is provided a brake drum 14 to which the wheel 11 is fastened by means of threaded lugs 15 that are arranged about a grease retaining cap 15 that encases the axle (not shown).

Figure 4:
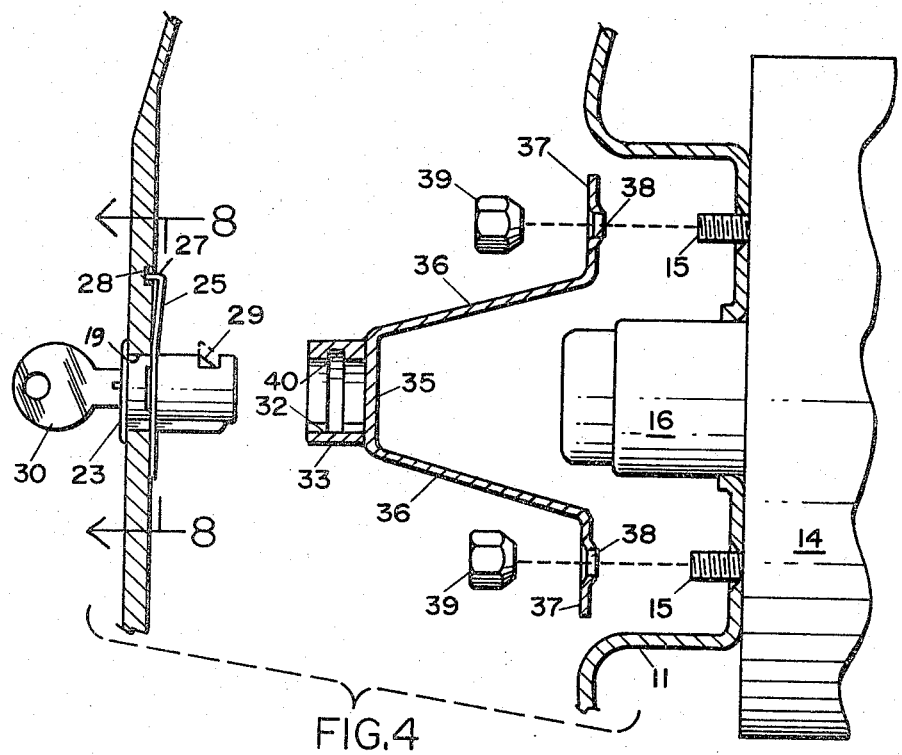
FIGURE 4 is a similar view showing the parts in exploded position.
Figure 3:
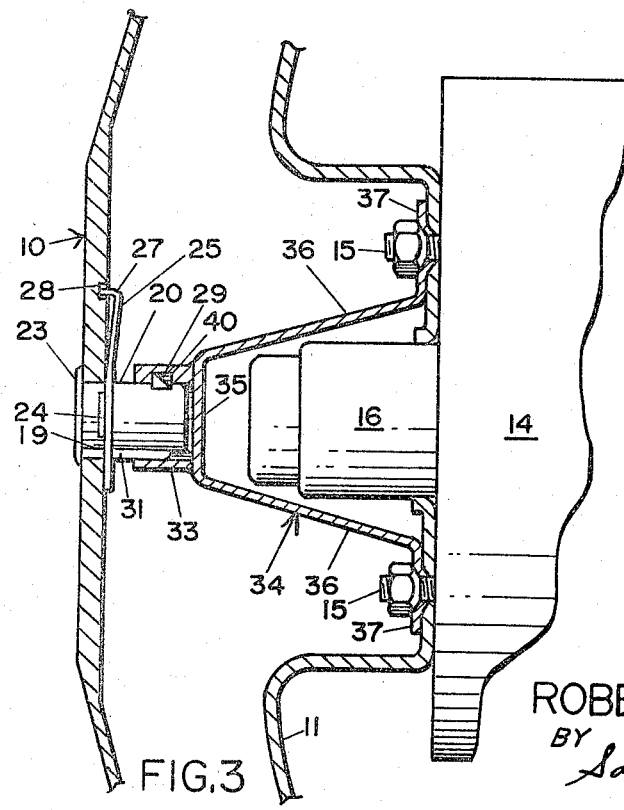
FIGURE 3 is a cross sectional view taken along the line 3—3 of FIGURE 1.
Figure 8:
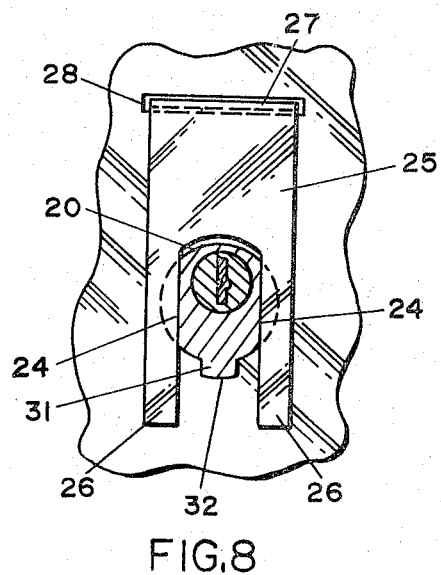
FIGURE 8 is a cross sectional view taken along the line 8—8 of FIGURE 4.
Figure 6:
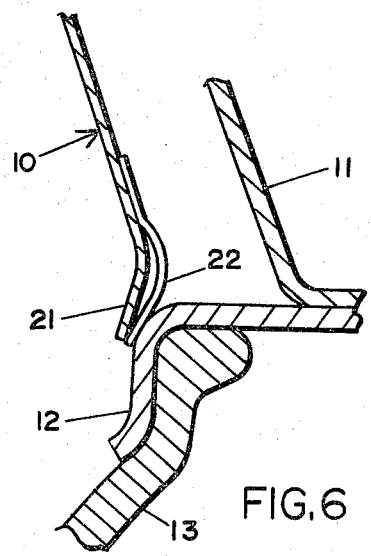
FIGURE 6 is a detailed cross sectional view taken along the line 6—6 of FIGURE 1.

My wheel cover 10 is disc-shaped having a centrally disposed bore 19 for receiving a barrel 20 of a conventional lock with the periphery 21 of the wheel cover 10 being flared outwardly away from the rim 12 as best shown by FIGURE 6. Spring elements 22 having one end secured to the inner surface of the wheel cover 10 and the other end yieldingly bearing on the rim 12 compel the wheel cover 10 to fit tightly against the rim 12. There are four such spring elements 22 positioned symmetrically about the periphery of the wheel cover 10. The barrel 20 of the lock is provided with a cap 23 which bears against the outside surface of the wheel cover 10 and a pair of slotted portions 24 for receiving the legs 26 of a U-shaped spring retainer 25. The upper portion of the spring retainer 25 is provided with a flange 27 that engages a slot 28 in the inner surface of the wheel cover 10 for securing the spring retainer 25 in position at all times. The lock 20 is a conventional tumbler type lock with a spring loaded keeper 29 that is made to withdraw within the confines of the cylinder 20 upon unlocking the lock by means of a key 30 as shown by the solid line position in FIGURE 4. A longitudinally disposed key 31 mounted on the lower portion of the barrel lock 20 is received by a key way 32 formed in a cylindrical support member 33 mounted on a bracket 34.

The mounting bracket 34 is provided with a base member 35 on which the cylindrical support member 33 is fastened with a pair of leg members 36 that terminates in a foot portion 37. Bores 38 that are formed in the foot portion 37 receive the lugs 15 of the automobile wheel and when nuts 39 are threaded tightly on the lugs 15 the cylindrical support member 33 will be in its proper position to support the wheel cover 10. The cylindrical support member 33 is provided with a recess or slot 40 which receives the keeper 29 for locking the wheel cover 10 to the support bracket 34. The wheel cover 10 is also provided with the usual opening 41 through which the tire valve stem 42 extends.

Figure 7:
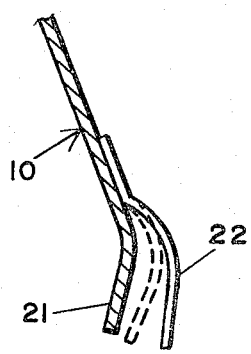
FIGURE 7 is a fragmentary cross sectional view of the wheel disc before being mounted on the wheel.
Figure 9:
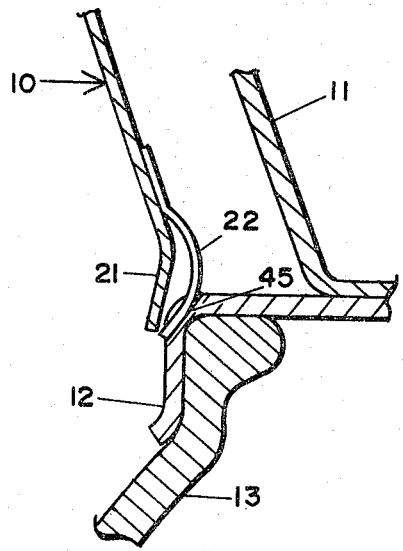
FIGURE 9 is a view similar to FIGURE 6 showing the notching of a tire rim for securing my wheel disc against rotational movement.

As can be readily noted from the discussion hereinabove taken in connection with the drawings, my combined wheel cover 10 is readily mountable on a conventional wheel of an automobile vehicle and locked in position to prevent the theft thereof. After the present conventional wheel cover is removed along with any two diametrically opposed wheel nuts 39, the mounting bracket 34 is placed in position and the nuts 39 threaded back on the lugs 15 to fasten the cylindrical support member 33 in position. Then the wheel cover 10 is taken in hand and the free end of the cylinder 20 of the lock is placed at the open end of the barrel support member 33. The key 31 is aligned with the key way 32 and the barrel 20 is made to slide inwardly of the cylindrical member 33. As the barrel 20 slides toward the base member 35 the keeper 29 will retract inwardly against a spring pressure and the spring elements 22 will engage the rim 12 of the wheel 11 and flex toward the periphery 21 of the wheel cover 10. When the spring elements 22 assume the solid line position shown in FIGURES 6 and 7, the keeper 29 will arrive at the position of the slot 40 and the keeper 29 will spring outwardly to engage the slot 40 and lock the wheel cover 10 to the wheel 11. The only way the wheel cover 10 can be removed from the wheel 11 is by use of the key 30 which when turned in the lock 20, the keeper 29 is retracted within the confines of the barrel 20 to disengage the keeper 29 from the slot 40 to thereby permit the barrel 20 to slide outwardly of the cylindrical support member 33.

In order to prevent any torsional forces to be exerted on the key 31 and keyway 32 when the automobile is speeding, the rim 12 may be provided with slots 45 to receive the spring elements 22. The spring elements resting in the slots 45 will hinder the tendency of the wheel cover 10 to rotate with relation to the wheel 11. Also the placing of the spring elements 22 in the slots 45 will assist in aligning the key 31 and the keyway 32.

Figure 11:
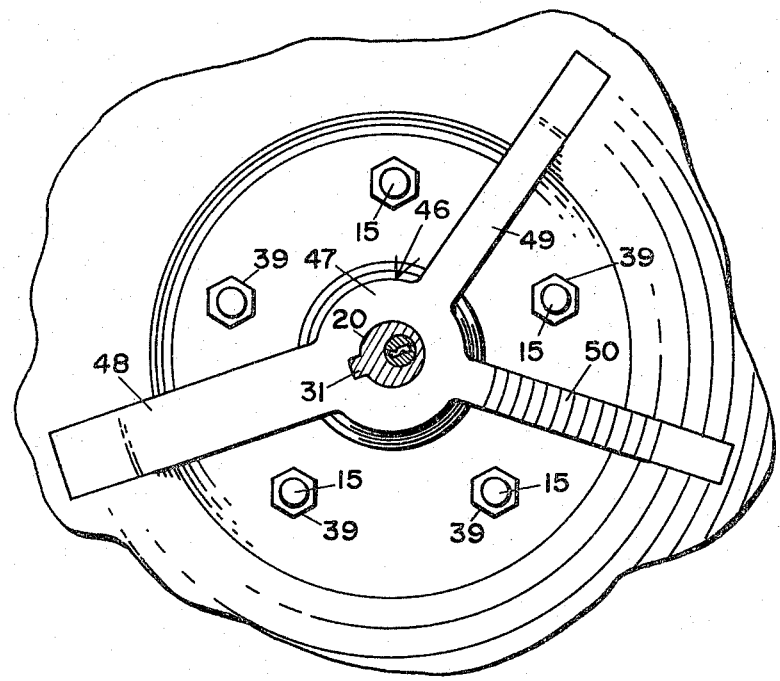
FIGURE 11 is a cross sectional view taken along the line 11—11 of FIGURE 10.
Figure 10:
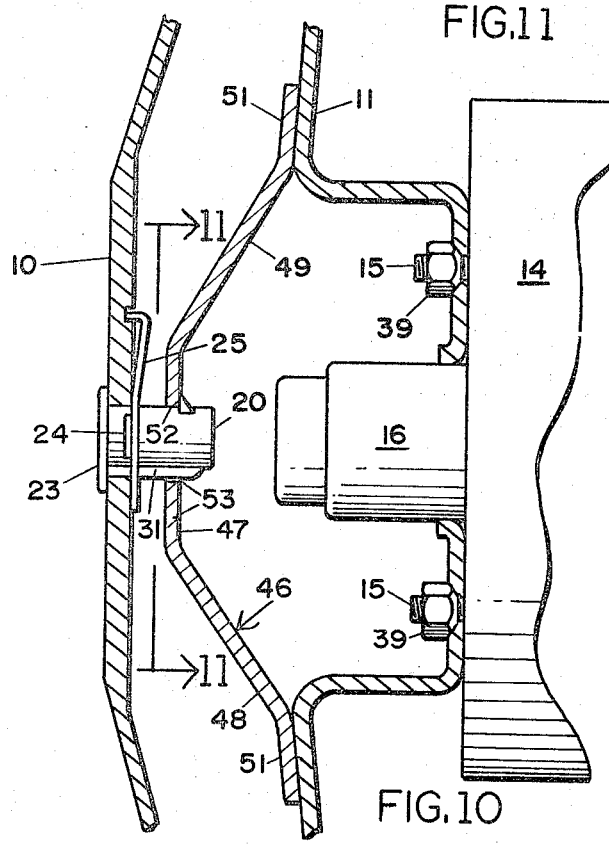
FIGURE 10 is a cross sectional similar to FIGURE 3 showing an alternate construction of my invention.

As indicated hereinabove, my wheel cover 10 is intended for use on a conventional wheel 11. The wheel cover 10 may be removed along with the mounting bracket 34 and the conventional wheel cover replaced on the wheel 11. FIGURES 10 and 11 show an alternate construction of my wheel cover 10 wherein its supporting bracket 46 is designed differently than that shown and described hereinabove and shown by FIGURES 1-5 inclusive.

The supporting bracket 46 is provided with a centrally disposed main body portion 47 with radially disposed leg portions 48, 49, 50 extending obliquely toward the wheel 11 terminating in foot portions 51 which are welded or otherwise secured permanently to the face of the wheel 11. The leg portions 48, 49 and 50 extend along a plane lying between the lugs 15 so that the nuts 39 are accessible as is obviously required in order to mount or remove the wheel 11 from the vehicle.

The main body portion 47 of the supporting bracket 46 is provided with a centrally disposed bore 52 of such size to receive the barrel 20 and a slot 53 to serve as a key way for the key 31. The wheel cover 10 itself shown in FIGURES 10 and 11 is identical in construction with that shown and described hereinabove in connection with FIGURES 1-9 inclusive and the manner of mounting the wheel cover 10 and removal of same on the mounting brackets 34 and 46 are identical. The only differences lie in the construction of the mounting brackets and the fact that the mounting bracket 46 is a permanent installation while the mounting bracket 34 may be removed from the wheel 11.

What I claim as new and desire to secure by Letters Patent of the United States is:

1. A combined wheel cover and locking means comprising a wheel cover having a substantially centrally disposed opening, a barrel lock extending through said opening, said barrel lock having a cap engaging one side of said wheel cover and a pair of oppositely positioned slotted portions on the other side of said wheel cover, a retainer having leg portions slidably positioned on said barrel lock engaging the other side of said wheel cover and said leg portions received by said slotted portions, a key mounted on said barrel lock, a mounting bracket having a plurality of leg portions, means for securing said leg portions to a wheel, lock receiving means mounted on said bracket receiving said barrel lock, said lock receiving means having a key way for properly positioning said wheel cover on said wheel and preventing the relative rotation of said wheel cover and said wheel and a plurality of spring elements secured at one end to said wheel cover and the other end extending to the periphery of said wheel cover in spaced relation thereto for engaging the rim of said wheel and yieldingly forcing said wheel cover in a direction away from said rim of said wheel.

2. A combined wheel cover and locking means comprising a wheel cover having a substantially centrally disposed opening, a barrel lock extending through said opening, said barrel lock having a cap engaging one side of said wheel cover and a pair of oppositely positioned slotted portions on the other side of said wheel cover, a retainer having leg portions slidably positioned on said barrel lock engaging the other side of said wheel cover and said leg portions received by said slotted portions, a flange mounted on said retainer and received by a slot on said wheel cover for releasably securing said retainer to said barrel lock, a key mounted on said barrel lock, a mounting bracket having a plurality of leg portions, means for securing said leg portions to a wheel, lock receiving means mounted on said bracket receiving said barrel lock, said lock receiving means having a key way for properly positioning said wheel cover on said wheel and preventing the relative rotation of said wheel cover and said wheel and a plurality of spring elements secured at one end to said wheel cover and the other end extending to the periphery of said wheel cover in spaced relation thereto for engaging the rim of said wheel and yieldingly forcing said wheel cover in a direction away from said rim of said wheel.

3. A combined wheel cover and locking means comprising a wheel cover having a substantially centrally disposed opening, a barrel lock extending through said opening, said barrel lock having a cap engaging one side of said wheel cover and a pair of oppositely positioned slotted portions on the other side of said wheel cover, a retainer having leg portions slidably positioned on said barrel lock engaging the other side of said wheel cover and said leg portions received by said barrel lock, a mounting bracket having a body portion, a plurality of leg portions secured at one end to said body portion, means for securing said leg portions to a wheel, a hollow cylindrical member mounted on said body portion, said hollow cylindrical member having a slot for receiving a keeper of said lock and a key way for receiving said key and properly positioning said wheel cover on said wheel and preventing the relative rotation of said wheel cover and said wheel and a plurality of spring elements secured at one end to said wheel cover and the other end extending to the periphery of said wheel cover in spaced relation thereto for engaging the rim of said wheel and yieldingly forcing said wheel cover in a direction away from said rim of said wheel.

4. A combined wheel cover and locking means comprising a wheel cover having a substantially centrally disposed opening, a barrel lock extending through said opening, said barrel lock having a cap engaging one side of said wheel cover and a pair of oppositely positioned slotted portions on the other side of said wheel cover, a retainer having leg portions slidably positioned on said barrel lock engaging the other side of said wheel cover and said leg portions received on said barrel lock, a mounting bracket having a flat wall portion, a plurality of leg portions secured at one end to said wall portion, foot means mounted on the free ends of said leg portions adapted to be secured to a wheel, said flat wall portion having a bore for receiving said barrel lock and engaging the keeper of said barrel lock and a key way for receiving said key on said barrel lock to properly position said wheel cover on said wheel and preventing the relative rotation of said wheel cover and said wheel and a plurality of spring elements secured at one end to said wheel cover and the other end extending to the periphery of said wheel cover in spaced relation thereto for engaging the rim of said wheel and yieldingly forcing said wheel cover in a direction away from said rim of said wheel.

References Cited by the Examiner
UNITED STATES PATENTS

| | | |
|---|---|---|
| 2,107,015 | 2/1938 | Short. |
| 2,329,945 | 9/1943 | Schatzman _____ 301—37 X |
| 2,535,126 | 12/1950 | Flowers. |
| 2,659,229 | 11/1953 | Skillman. |
| 2,874,561 | 2/1959 | Alger _____ 70—169 |
| 3,170,733 | 2/1965 | Lamme _____ 301—37 |
| 3,248,915 | 5/1966 | Scheiman _____ 301—37 X |

BENJAMIN HERSH, Primary Examiner.

RICHARD J. JOHNSON, Examiner.